United States Patent Office 2,964,471
Patented Dec. 13, 1960

2,964,471
METHOD OF INHIBITING CORROSION

William B. Hughes, Webster Groves, Mo., assignor to Cities Service Research and Development Company, New York, N.Y., a corporation of New Jersey No Drawing. Filed June 26, 1959, Ser. No. 823,024

6 Claims. (Cl. 252—8.55)

This invention relates to inhibiting corrosion of metals, and is more particularly directed to improved compositions and processes for minimizing the corrosive effect of oil brine mixtures on oil field production and transmission equipment.

This application is a continuation in part of my co-pending application Serial No. 581,853, filed May 1, 1956, now U.S. Patent No. 2,911,419.

It is generally recognized that oil-producing formations often yield with the crude oil a brine which is extremely corrosive in its action upon the oil-producing and collecting equipment, including the metal tubing, casings, pumps, pipe lines, tanks and other storage equipment. This type of corrosion is particularly noticeable in wells producing brine which contain varying amount of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide new and improved corrosion inhibiting compounds having properties and characteristics which make them uniquely effective in minimizing and reducing corrosion of metals.

It is another object of this invention to provide new corrosion inhibitors which are particularly effective in preventing corrosion in wells producing oil brine and in reducing corrosion in wells in which large amounts of brine are produced as compared to oil.

I have discovered that certain new compounds namely, thiazoline-oxazolines, possess unexpected and most effective protection against corrosion. These new thiazoline-oxazoline compounds are prepared by first reacting substantially equimolar amounts of monoethanolamine with a dicarboxylic acid in the presence of an excess amount of phosphorous pentasulfide to provide an intermediate product, namely a thiazoline, which has a free carboxyl group. Reacting the carboxyl group of the intermediate thiazoline compound with a second mol of monoethanolamine provides the new thiazoline-oxazoline compounds of this invention.

The intermediate thiazoline compound can be prepared if desired, by reacting 2-aminoethanol (monoethanolamine) with a dicarboxylic acid under conditions which permit the removal of 2 mols of water to provide an oxazoline ring compound. Formation of the oxazoline is obtained by removing 2 mols of water from the reaction mixture for each mol of acid used. Water removal is accomplished by azeotropic distillation using an azeotrope forming solvent, such as benzene, toluene, xylene or the like. The intermediate thiazoline compound utilized in the present invention is then obtained by reacting the oxazoline with an excess of phosphorus pentasulfide. Carrying out this reaction according to the method described by Morton in the "Chemistry of Heterocyclic Compounds," McGraw-Hill, p. 419, effects substitution of sulfur for oxygen in the oxazoline ring, thus providing the desired thiazoline compound. It is not necessary according to my invention that the oxazoline ring structure be formed first, however, with conversion thereafter to the thiazoline. The preferred method is to use the phosphorous pentasulfide as a cyclizing agent and form the intermediate thiazoline compound directly as is more fully described hereafter.

The structure of the thiazoline-oxazoline compounds, which I have found to possess most effective and superior corrosion inhibiting properties may generally be represented as follows:

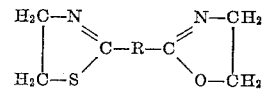

wherein R is the residue of a dibasic acid having from 1 to 18 carbon atoms.

In preparing these compounds, equimolar amounts of monoethanolamine and a selected dibasic acid are heated in the presence of a small excess of phosphorous pentasulfide. The mixture is heated under reflux in the presence of an azeotrope forming solvent, such as those previously referred to, until approximately 2 mols of water are recovered for each mol of the dibasic acid used. The temperature of the reflux will vary depending on the particular azeotrope forming solvent used. When benzene, toluene or xylene are used, a reflux temperature in the range of from about 80° C. to about 150° C. will be used. It is generally necessary to heat the reaction mixture from about 1 to 10 hours depending on the temperature at which heating is carried out. Heating at a higher temperature reduces the time necessary to obtain complete reaction, that is, the formation of the thiazoline ring.

After recovery from the reaction zone of the theoretical amount of water obtainable in forming the thiazoline ring with the previously identified reactants, excess phosphorous pentasulfide is removed from the reaction zone by washing with water. Wash water is removed by azeotropic distillation leaving the intermediate thiazoline compound. To obtain the thiazoline-oxazoline compounds which I have found to be unexpectedly effective corrosion inhibitors, a second mol of monoethanolamine is added to the intermediate thiazoline product. The mixture is heated in the presence of an azeotrope forming solvent at a temperature not substantially higher than the boiling point of the azeotrope forming solvent so that an additional 2 mols of water can be obtained from the reaction zone. Upon recovery of the 2 mols of water and removal of the azeotrope forming solvent from the reaction zone, by distillation, the final thiazoline-oxazoline product will be obtained.

In preparing the thiazoline-oxazoline compounds of my invention, I have found that a dicarboxylic acid having from 1 to 18 carbon atoms can be used. The acid selected may be saturated or unsaturated and have a ring, straight chain or branched chain configuration. The acid may include substituents, such as hydroxyl groups, if desired. Among the dicarboxylic acids which I have found to be particularly effective in preparing the thiazoline-oxazoline compounds of my invention are dimerized linoleic acid, generally referred to as dimer acid, oxalic, malonic, methyl malonic, succinic, methyl succinic, glutaric, adipic, pimelic, suberic, azelic, sebacic, phthalic, brassic, brassylic, roccellic, terephthalic, tartonic, malic, citramalic, tartaric, dihydroxy-tartaric, mucic and tetrahydroxyadipic acids. Unsaturated dicarboxylic acids such as maleic, citraconic, glutaconic acids as well as hydroxy dibasic acids including tartronic, malic, citramalic, tartari, and tri-hydroxy glutaric and mucic acids.

In order to more fully understand this invention and more particularly the manner in which the improved compositions thereof are obtained, and the manner in which they inhibit corrosion, the following specific examples are provided.

EXAMPLE 1

To 60 grams (1.0 mol) of aminoethanol, 600 grams of dimerized linoleic acid were added, together with 67 grams (0.3 mol) of phosphorous pentasulfide (M.W. 222) and 100 ml. of xylene. This mixture was heated for 90 minutes at a temperature of about 150° C. in a decanter type still with water being removed from the reaction zone as an azeotrope and separated from the xylene by means of a water trap. When approximately 36 grams of water had been recovered, representing the theoretical amount of water recoverable in forming the intermediate thiazoline compound, with the quantities of reactants utilized, reflux was discontinued. The reaction mixture was a dark colored oil having a sulfurous odor. Excess phosphorous pentasulfide was removed from the reaction mixture by washing with water with the wash water being distilled as a xylene azeotrope. To the reaction mixture after removal of water, an additional 60 grams (1.0 mol) of 2-aminoethanol were added and heating continued for an additional 90 minutes at approximately 150° C. with 2 additional mols of water being recovered indicating formation of the oxazoline ring by reaction of the carboxyl group of the intermediate thiazoline compound and the amine group of the 2-aminoethanol. Xylene was removed from the reaction zone by distillation and the temperature of the residue raised to 280° C. to insure closure of the oxazoline ring. The final reaction product was a heavy black material having a molecular weight of 656 according to the method of Rast (Ber. 55, 1051, 3727, 1922). The theoretical molecular weight for this thiazoline-oxazoline compound is 668. The product was tested as a corrosion inhibitor according to the test hereafter described and provided the protection indicated for inhibitor No. 1 in the table which follows.

EXAMPLE 2

Following the procedure set forth in Example 1, 60 grams of 2-aminoethanol were reacted with 102 grams of succinic acid. To the reaction mixture 67 grams of phosphorous pentasulfide and 100 ml. of xylene were added. The mixture was heated under reflux for approximately 2 hours at a temperature of about 150° C. until approximately 2 mols of water had been recovered in a water trap. Excess phosphorous pentasulfide was removed by water washing. Wash water was removed as an azeotrope and the xylene solvent removed from the reaction zone by distillation.

The thiazoline compound obtained was then further reacted in the amount of 13.8 grams of the compound to 6.1 grams of 2-aminoethanol in the presence of 50 ml. of xylene. The reaction was carried out under heat at the conditions described in Example 1. After approximately 2 mols of water had been recovered from the reaction zone, the xylene solvent was removed by distillation leaving a dark colored, oil soluble thiazoline-ozazoline product having a molecular weight of 241. This product has a theoretical molecular weight value of 245. The product is identified as inhibitor No. 2 in the table which follows.

EXAMPLE 3

According to the method described in Example 1 above, 1 mol (166 grams) of terephthalic acid was reacted with 1 mol (60 grams) of 2-aminoethanol in the presence of 0.3 mol (67 grams) of phosphorous pentasulfide in the presence of 100 ml. of xylene. The reaction mixture was heated for approximately 2 hours under reflux at a temperature of about 150° C. After recovery of 2 mols of water indicating formation of the thiazoline ring, excess phosphorous pentasulfide was removed by washing with water. Excess water and the xylene solvent were thereafter removed by distillation to yield an intermediate yellow-colored thiazoline compound having a molecular weight of about 200.

20 grams of the foregoing thiazoline compound were thereafter reacted with 6.1 grams of 2-aminoethanol in the presence of 50 ml. of xylene under conditions similar to those described in Examples 1 and 2 so that formation of the oxazoline ring was obtained by removing 2 molecules of water from the reaction mixture. The final thiazoline-oxazoline product had a molecular weight according to the method of Rast of 221 as compared to the expected molecular weight value for this product of 226.

This product, tested as a corrosion inhibitor, is identified as inhibitor No. 4 in the table.

The effectiveness of the thiazoline-oxazoline compounds of this invention and as described in the foregoing examples, will be more evident from the table which follows, wherein results of the protection provided by these compounds is reported.

The test utilized in comparing the effectiveness of the various compounds of this invention utilizes prepared brines which substantially duplicate corrosion conditions met in oil field operations. While the tests were conducted primarily on these prepared brines, it is, of course, understood that the compounds of my invention may be utilized under a wide variety of corrosion conditions. This test is generally referred to as a static test, since no movement of test strips is made after the test strip has been immersed in the brine. This is to be contrasted with the dynamic test described in my copending application, Serial Number 552,264, filed December 12, 1955, now U.S. Patent No. 2,940,927, wherein the test strip is continuously dipped in the corrosive brine over a fixed period of time.

The test procedure used herein involved a measurement of the corrosive action of a hypothetical well fluid as inhibited with compositions described above upon weighed, cleaned, and polished strips of number 18 gauge, cold rolled steel measuring one-quarter inch by four inches, under conditions closely approximately those existing in a producing well and a comparison thereof with the results obtained by subjecting identical strips to the corrosive action of the hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlenmeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosion inhibitor being tested was added to each flask in amounts ranging from 10 to 25 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times, precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight percent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be calculated for each of the test strips taken from the inhibited test fluids in accordance with the following formula:

$$\frac{L1-L2}{L1} \times 100 = \text{percent protection}$$

in which L1 is the loss in weight of strips taken from uninhibited test fluids, and L2 is the loss in weight of strips which were subjected to inhibited test fluids.

Following the procedure outlined above, compounds prepared according to the foregoing examples were tested as corrosion inhibitors. The results of these tests are recorded in the table which follows:

| Inhibitor No. | Formulation | Protection | | |
|---|---|---|---|---|
| | | 25 p.p.m. | 10 p.p.m. | 5 p.p.m. |
| 1 | MEA* Dimer+⅓ P₂S₅+MEA | 96.1 | 94.3 | 82.9 |
| 2 | MEA Succinic+⅓ P₂S₅+MEA | 95.3 | 90.1 | 77.8 |
| 3 | MEA Sebacic+⅓ P₂S₅+MEA | 94.8 | 91.3 | 76.8 |
| 4 | MEA Terephthalic+⅓ P₂S₅+MEA | 99.1 | 96.8 | 93.2 |
| 5 | MEA Mucic+⅓ P₂S₅+MEA | 92.9 | 81.7 | 79.3 |

*Monoethanolamine.

It will be evident from the foregoing table that the thiazoline-oxazoline compounds of this invention provide exceptionally fine protection of the metal surfaces with which they come in contact. In using the new compounds of my invention for protecting various metal surfaces including piping, casing, storage equipment, and other surfaces, which come in contact with corrosive fluids, I have found that excellent protection can be obtained by injecting a small but appropriate quantity of a selected thiazoline-oxazoline compound. Injection of substantial quantities of inhibitor, for example 10-20%, would provide increased protection, but might not be economically justified. Generally not more than 1500 to 2000 p.p.m. will be used in the corrosive liquid coming in contact with the metal surface. When treating producing oil wells, for example, I often use about 200 or 300 p.p.m. of the corrosion inhibiting compound and inject the same into the well so that the inhibitor can mingle wtih the oil brine mixture and come in contact with the producing equipment. If desired, the inhibiting compound may be introduced directly into the top of the casing either with or without inert carriers such as kerosene, gas oil or the like, and be permitted to flow down into the well and then back through the tubing and into related apparatus. I have found that if this procedure is followed, substantial reduction in corrosion throughout the entire producing and collection system may be obtained.

The method of the inhibiting action of the improved compositions of my invention is not fully understood, but apparently the thiazoline-oxazoline structures preferentially wet the surface of the metal, thus excluding the corrosive material or fluid from coming into contact with the metal. In any event, however, despite the lack of complete understanding of the mechanics of the protective effect obtained, the new compounds of my invention, as the results show, are extremely and surprisingly effective in protecting metallic surfaces.

It is to be understood that the new compounds of my invention are not limited to use alone or singly, and may be utilized along with other agents commonly introduced into producing wells for breaking emulsions, preventing scale formation, minimizing pitting, etc. It is further evident that my invention is not restricted to the use of improved compositions for inhibiting corrosion in oil wells, but may be employed to perform this function in the presence of corrosive fluids derived from many other sources.

What I claim is:

1. The method of reducing the corrosion of ferrous metals when exposed to the corrosive action of corrosive fluids, which include an acidic component selected from the group consisting of carbon dioxide and hydrogen sulfide which comprises introducing into said corrosive fluids a small quantity, sufficient to substantially inhibit corrosion, of an inhibitor having the formula

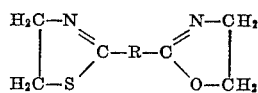

wherein R is a divalent hydrocarbon radical having from 1 to 18 carbon atoms and passing the corrosive fluids in contact with the metal to be protected.

2. The method of reducing corrosion as claimed in claim 1 wherein the inhibitor has the formula

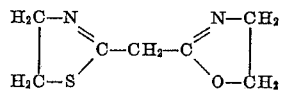

3. The method of reducing corrosion as claimed in claim 1 wherein the inhibitor has the formula

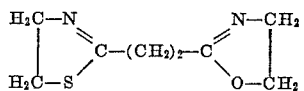

4. The method of reducing corrosion as claimed in claim 1 wherein the inhibitor has the formula

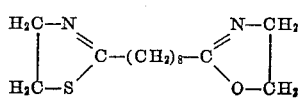

5. The method of reducing corrosion as claimed in claim 1 wherein the inhibitor has the formula
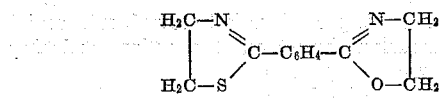
6. The method of reducing corrosion as claimed in claim 1 wherein the inhibitor has the formula
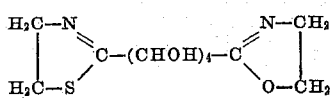
References Cited in the file of this patent
UNITED STATES PATENTS
| | | |
|---|---|---|
| 2,154,096 | Loane | Apr. 11, 1939 |
| 2,547,497 | Rowland | Apr. 3, 1951 |
| 2,652,363 | Woods et al. | Sept. 15, 1953 |
| 2,723,233 | Lytle | Nov. 8, 1955 |
| 2,832,735 | Hughes | Apr. 29, 1958 |
| 2,924,571 | Hughes | Feb. 9, 1960 |